United States Patent [19]

Rasmussen

[11] Patent Number: 4,806,915

[45] Date of Patent: Feb. 21, 1989

[54] APPARATUS FOR INDICATING POSITION OF A PISTON WITHIN A CYLINDER

[75] Inventor: Robert Rasmussen, Buffalo, Minn.

[73] Assignee: Progressive Assembly Machine Co., Inc., Plymouth, Minn.

[21] Appl. No.: 92,484

[22] Filed: Sep. 3, 1987

[51] Int. Cl.[4] .............................................. G05B 21/00

[52] U.S. Cl. ................................ 340/686; 73/119 R; 200/61.41; 340/540; 417/63

[58] Field of Search ............. 340/686, 540; 73/119 R, 73/168; 200/61.41, 61.58 R, 47; 417/63

[56] References Cited

U.S. PATENT DOCUMENTS

| | | | |
|---|---|---|---|
| 1,557,957 | 10/1925 | Amrhein | 340/686 |
| 2,361,462 | 10/1944 | Dickinson | 340/686 |
| 2,567,430 | 9/1951 | Griffiths | 340/686 |
| 4,168,413 | 9/1979 | Halpine | 200/61.41 |

*Primary Examiner*—Glen R. Swann, III

*Attorney, Agent, or Firm*—Dorsey & Whitney

[57] ABSTRACT

A mechanically actuated sensor indicates the position of a piston within the cylinder of a piston and cylinder assembly. The sensor includes a cam that partially extends into the cylinder chamber for abutting contact with the piston, and a lever arm extending through the cylinder wall for transmitting movement of the cam to a signalling device mounted externally of the cylinder chamber.

8 Claims, 3 Drawing Sheets

APPARATUS FOR INDICATING POSITION OF A PISTON WITHIN A CYLINDER

TECHNICAL FIELD

This invention pertains to a piston and cylinder assembly having a piston position sensor. In particular, it pertains to a mechanically actuated piston position sensor having a piston engaging, rotatable cam.

BACKGROUND ART

Piston actuated pumps are widely known. In certain applications it is necessary to know the position of the pumping piston within the piston cylinder. One method of sensing the position of the pumping piston is through the use of a magnetic reed switch. The magnetic reed switch, however, lacks accuracy and cannot discriminate between two pistons operating within the same cylinder. A mechanically actuated switch could be more accurate and could discriminate between multiple pistons. A mechanical switch, however, presents the problem of sealing between the cylinder interior and the switch. A piston position sensor that incorporated a mechanically actuated switch into a piston and cylinder assembly with a reliable, fluid tight seal between the cylinder and the switch, would be a significant advantage.

SUMMARY OF THE INVENTION

The present invention comprises a piston position sensor mountable on a piston cylinder that is both highly accurate and easily sealed. A suitable piston is carried within the cylinder. The position sensor includes an elongated rotatable cam carried by the cylinder body, a lever arm, and a suitable signalling device such as an electric switch. The cam includes a piston abutting rib and opposed O-ring seals. The lever arm couples the cam to the electric switch and radially extends and amplifies the movement of the cam.

In operation, the piston moves between two extreme positions within the cylinder. In one extreme position the piston abuts against the rib on the cam. The cam is thereby rotated and the lever arm transmits the cam's movement to the electric switch. As the piston moves to its other extreme position and disengages the cam, the cam is returned to its original position by a biasing spring, and the electric switch returns to its original state. The O-rings maintain a fluid tight seal against pressure differences between the inner wall and the outer surface of the cylinder.

DETAIL DESCRIPTION OF THE DRAWINGS

Figure 1:
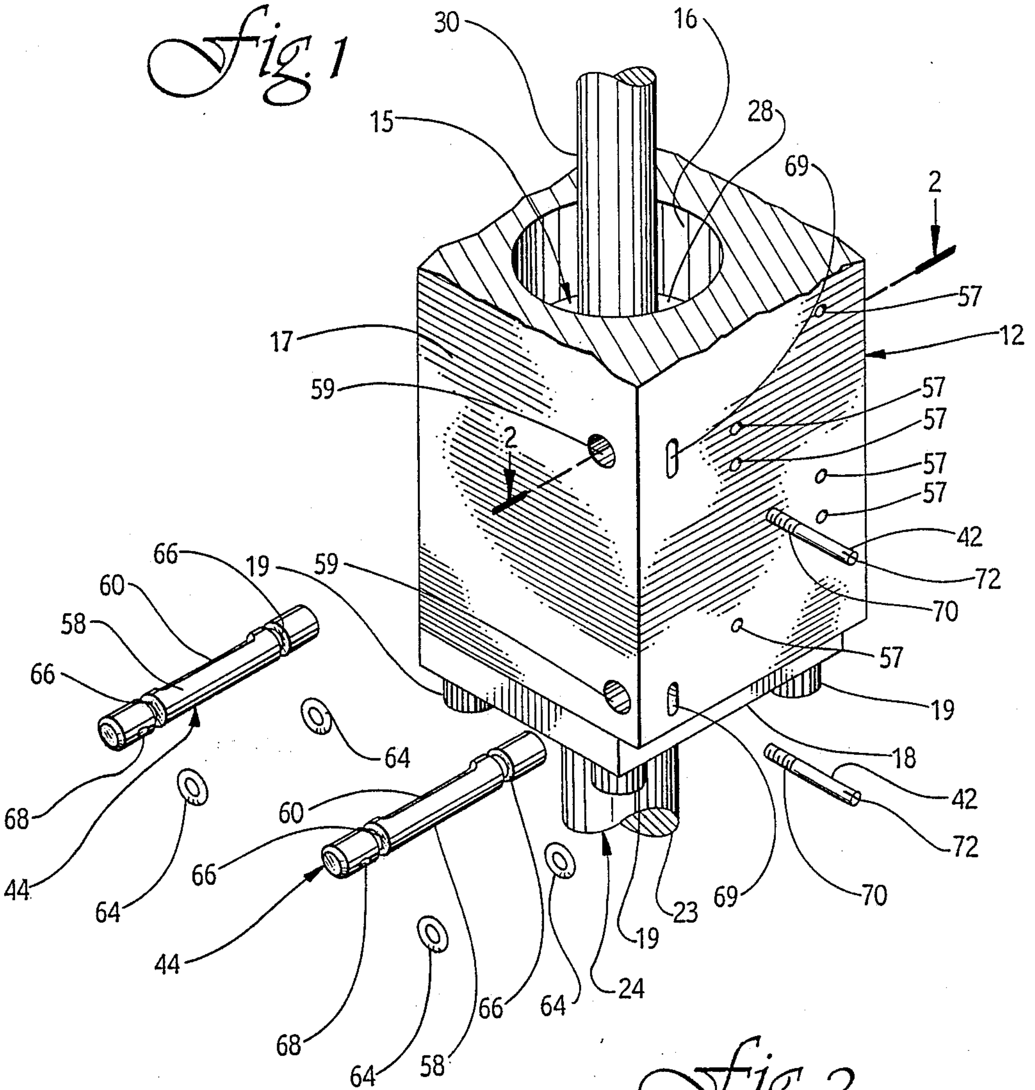
FIG. 1 is an exploded, fragmentary, perspective view depicting a piston position sensor in accordance with the present invention in conjunction with a piston and cylinder assembly.
Figure 2:
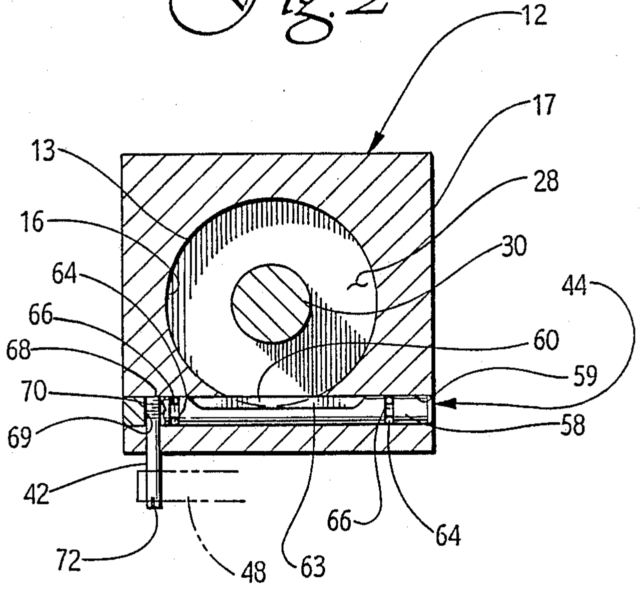
FIG. 2 is a sectional view taken along the line 2—2 of FIG. 1.
Figure 3:
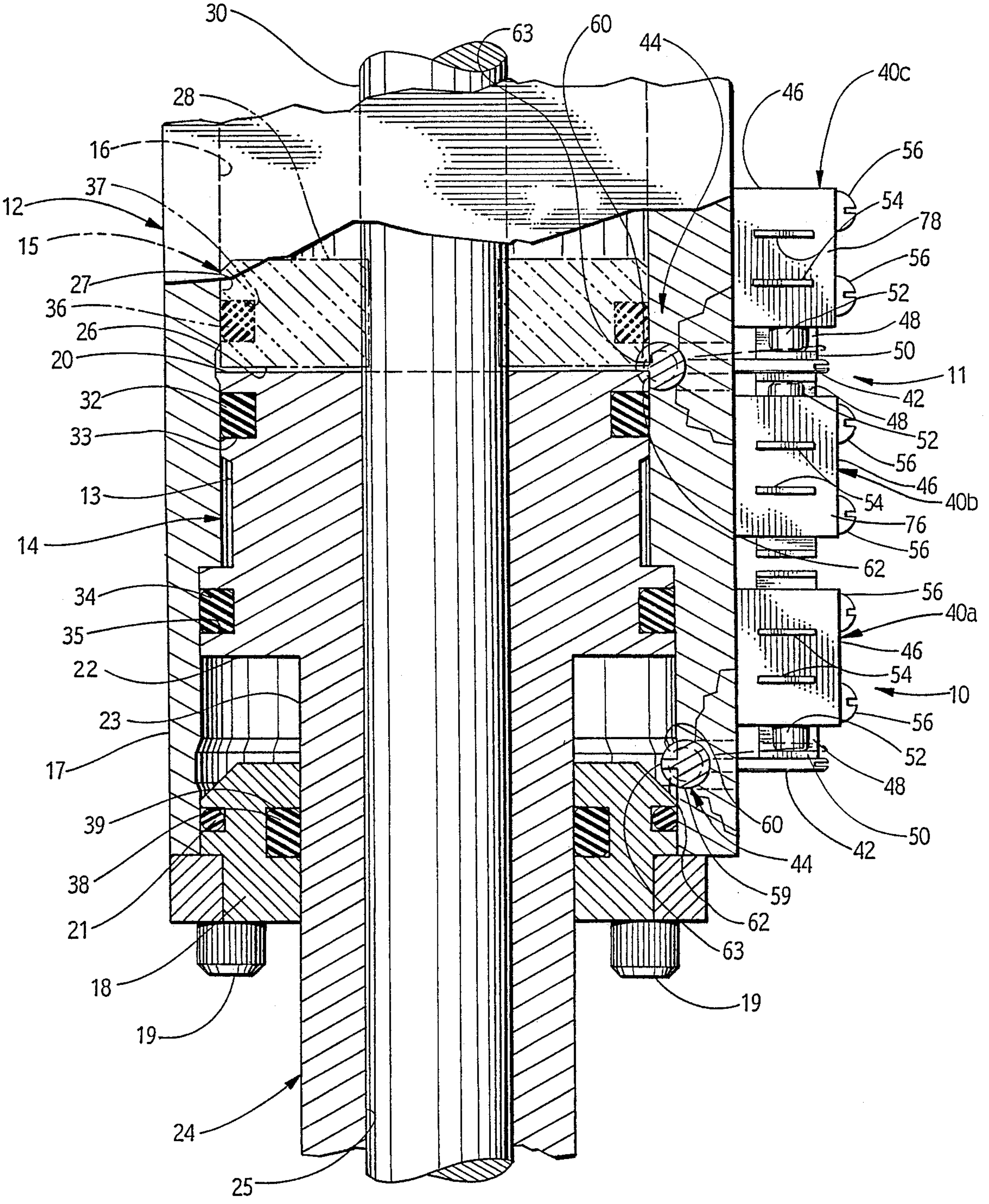
FIG. 3 is a fragmentary, sectional side view of the apparatus depicted in FIG. 1.
Figure 4:
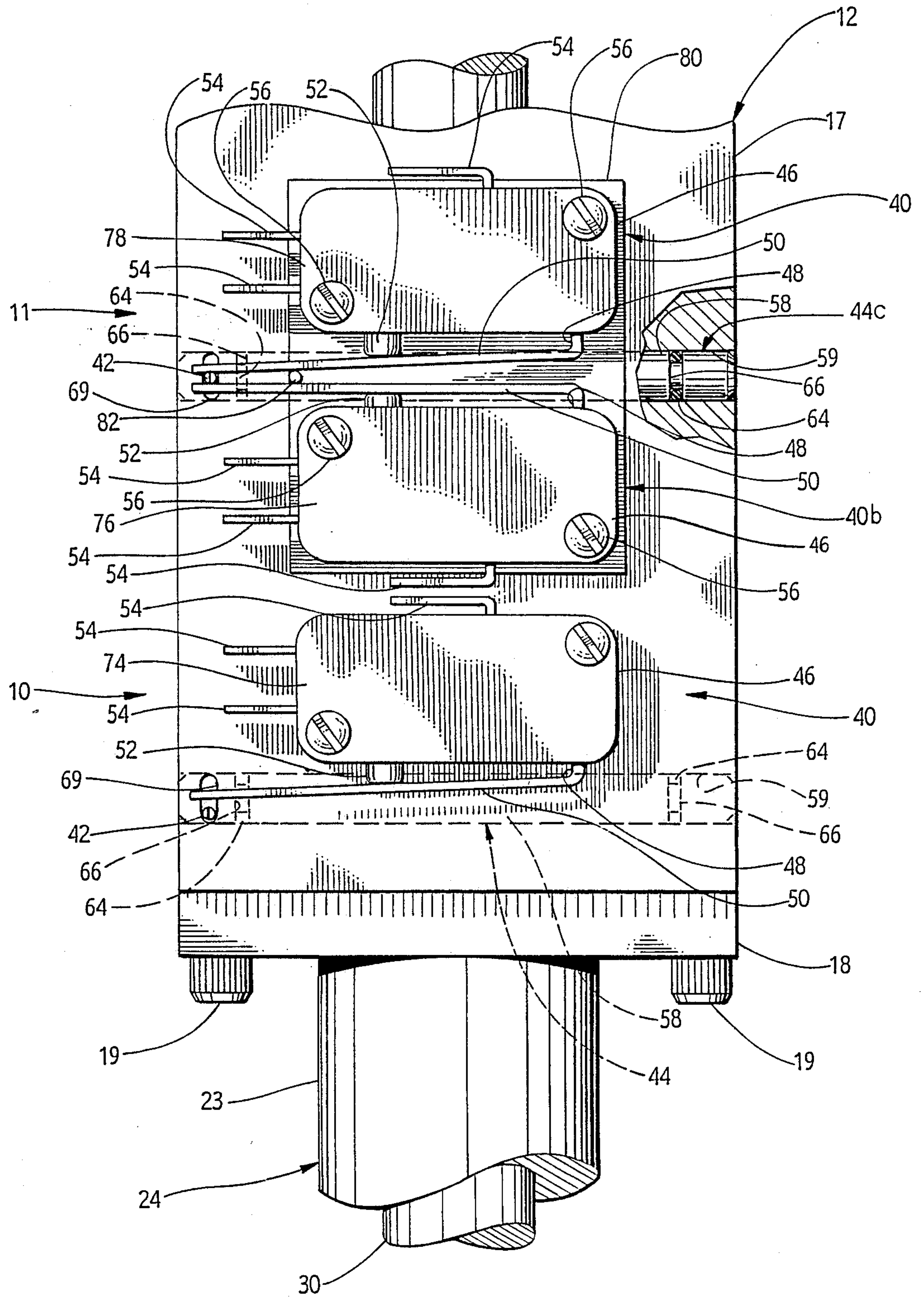
FIG. 4 is an elevational view of the apparatus depicted in FIG. 1, with portions removed for clarity.

Referring to the drawings, a single action piston position sensor assembly 10 and a double action piston position assembly 11 are depicted in conjunction with a piston cylinder 12, a lower piston 14 and an upper piston 15. The piston cylinder 12 includes an inner cylinder wall 16, an outer cylinder surface 17 and a cylinder base 18. The cylinder base 18 is mounted to the piston cylinder 12 with cylinder base fasteners 19 and sealed with base sealing ring 21.

The lower piston 14 includes an outer piston wall 13, a lower piston head 20, a lower piston base 22, and a lower piston rod 24. The lower piston rod 24 is generally tubular, and includes a lower piston rod outer wall 23 and a lower piston rod inner wall 25. The upper piston 15 includes an outer piston wall 27, an upper piston head 26, an upper piston base 28, and an upper piston rod 30. The upper piston rod 30 is axially received through the lower piston 14. The lower piston 14 is sealed with respect to the inner cylinder wall 16 by a lower piston head sealing ring 32 in a lower piston head sealing ring groove 33, and a lower piston base sealing ring 34 in a lower piston base sealing ring groove 35. The upper piston 15 is sealed with respect to the inner cylinder wall 16 by an upper piston head sealing ring 36 in an upper piston head sealing ring groove 37. The lower piston rod 24 is sealed with respect to the cylinder base 18 by sealing ring 38 carried by cylinder base 18 in a sealing ring groove 39.

The single action piston position sensor assembly 10 and double action piston position sensor assembly 11 each include an electric switch 40, a lever arm 42, and a cam 44. The double action piston position sensor assembly 11 differs from the single action piston position sensor assembly 10 only in that it includes a pair of opposed electric switches **40*b*, *c* instead of a single electric switch 40*a***.

Each electric switch 40 includes an electric switch housing 46. The electric switch housing 46 carries an elbow spring 48 having an elongated spring arm 50. The spring arm 50 abuts against a switch activator button 52. Electric contacts 54 extend through the electric switch housing 46. Switch mounting screws 56 extend through the electric switch housing 46 and are received in switch mounting screw holes 57 on the outer cylinder surface 17.

Each cam 44 comprises an elongated rod 58 rotatably received through a respective cam positioning channel 59 in the piston cylinder 12. Each cam 44 includes an upper elongated striker notch 60 and a lower elongated striker notch 62. The notches 60, 62 present piston engaging striker 63. Sealing O-rings 64 are received by each cam 44 in O-ring grooves 66. The lever arms 42 are threadably received in threaded mounting holes 68 by their respective cams 44. The lever arms 42 extend through the outer cylinder surface 17 via respective lever arm guiding slots 69. Each lever arm 42 includes a threaded, cam engaging end 70 and a switch lever engaging clevis 72 at the opposed end.

Referring in particular to the single piston position sensor assembly 10, a single electric switch **40*a* is mounted in proximity to a lever arm 42 and cam 44, such that the spring arm 50 of the single electric switch 40*a* abuts the lever arm 42. Referring to the double action piston position sensor assembly 11, a lower electric switch 40*b* and an opposed upper electric switch 40*c* are mounted in proximity to a single lever arm 42 and cam 44 such that the spring arms 50 of switches 40*b* and 40*c* abut the single lever arm 42. A plate 80 presents a stop tab 82 positioned between the spring arms 50 of electric switches 40*b* and 40*c***.

In operation, the lower piston 14 and the upper piston 15 are driven by the lower piston rod 24 and the upper piston rod 30 respectively in reciprocating action. The lower piston head sealing ring 32, lower piston base sealing ring 34, upper piston head sealing ring 36, and the base sealing ring 21, form fluid tight seals between the piston cylinder 12 and the lower piston head 20, lower piston base 22, lower piston rod 24, upper piston head 26, upper piston base 28 and the cylinder base 18, respectively. The lower piston rod sealing ring 38 forms a fluid tight seal between the lower piston rod 24 and cylinder base 18.

The single action piston position sensor assembly 10 is configured to provide an electrical signal when the lower piston 14 is retracted to the fully lowered position. The lower piston base 22 of lower piston 14 abuts the striker 63 of cam 44 when the lower piston 14 is retracted to its fully lowered position. The cam 44 is thereby rotated within channel 59. The lever arm 42 radially amplifies and extends this rotation, shifting the spring arm 50 of switch 40*a* upwardly. The switch actuator button 52 is thereby shifted upwardly within switch housing 46 to provide the electrical signal indicating that the piston 14 is fully lowered. Once the lower piston 14 shifts upwardly from the fully lowered position, the lower piston base 22 will disengage from abutting contact with cam 44, and the spring arm 50 will urge the lever arm 42 downwardly so as to rotate the cam 44 back to its original null position. The sealing O-rings 66 maintain fluid tight integrity between the cam 44 and the cylinder 12.

The double action piston position sensor assembly 11 is configured to provide a first electrical signal when the lower piston 14 is extended to the fully raised position, and to provide a second electrical signal when the upper piston 15 is in its lowered position. The cam 44 is rotated downwardly from the horizontal null position when the piston head 20 of lower piston 14 abuts the striker 63 of cam 44. The lever arm 42 radially amplifies and extends this rotation, shifting the spring arm 50 of switch 40*b* downwardly. The switch actuator button 52 of switch 40*b* is thereby shifted downwardly within its switch housing to provide the first electrical signal indicating that the piston 14 is raised. Once the lower piston 14 shifts downwardly from the fully raised position, the piston head 20 of lower piston 14 will disengage from abutting contact with cam 44 and the spring arm 50 of switch 40*b* will urge the cam 44 towards its original null position. Stop 82 prevents the spring arm 50 of switch 40*b* from urging the lever arm 42 upwardly beyond the null position.

Again referring to double action piston position sensor assembly 11, the cam 44 is rotated upwardly from the horizontal null position when the piston head 26 of upper piston 15 abuts the striker 63 of cam 44. A lever arm 42 radially amplifies and extends this rotation, shifting the spring arm 50 of switch 40*c* upwardly. The switch actuator button 52 of switch 40*c* is thereby shifted upwardly within its switch housing to provide the second electrical signal indicating that the piston 15 is lowered. Once the upper piston 15 shifts upwardly from the lowered position, the piston head 26 of upper pistons 15 will disengage from abutting contact with cam 44 and the spring arm 50 of switch 40*c* will urge the cam 44 towards its original null position. Stop 82 prevents the spring arm 50 of switch 40*c* from urging the lever arm 42 downwardly beyond the null position.

I claim:

1. A piston sensing apparatus for sensing the position of a piston carried within a cylinder, said cylinder having a cylinder body, an inner cylinder wall and a cylinder outer surface, comprising:

a signalling device mounted externally of said inner cylinder wall; and a cam at least partially received within said inner cylinder wall for operable abutting contact with said piston for movement in a first direction when said piston operably engages said cam and movement in a second direction when said piston operably disengages said cam, said cam including means extending outwardly beyond said inner cylinder wall for operable coupling with said signalling device, said cam further including means for forming a fluid tight seal within said cylinder body along said cam and between said inner cylinder wall and said cylinder outer surface.

2. A piston position sensing apparatus for sensing the position of a piston carried within a cylinder, said cylinder having an inner cylinder wall and a cylinder outer surface, comprising:

a signalling device mounted externally of said inner cylinder wall; and a cam at least partially received within said inner cylinder wall for operable abutting contact with said piston for movement in a first direction when said piston operably engages said cam and movement is a second direction when said piston operably disengages said cam, said cam including means extending outwardly beyond said cylinder wall for operable coupling with said signalling device, said cam further including means for forming a fluid tight seal along said cam and between said inner cylinder wall and said cylinder outer surface;

said means extending outwardly comprising a lever arm shiftably received through said cylinder wall and operably coupled to said cam for extending and amplifying said movement of said cam.

3. An assembly as claimed in claim 2, including a means for urging said lever arm to a null position.

4. A piston position sensing apparatus for sensing the position of a piston carried within a cylinder, said cylinder having an inner cylinder wall and a cylinder outer surface, comprising:

a signalling device mounted externally of said inner cylinder wall; and a generally cylindrical cam at least partially received within said inner cylinder wall for operable abutting contact with said piston for movement in a first direction when said piston operably engages said cam and movement in a second direction when said piston operably disengages said cam, said cam including means extending outwardly beyond said inner cylinder wall for operable coupling with said signalling device, said cam further including means for forming a fluid tight seal along said cam and between said inner cylinder wall and said cylinder outer surface.

5. An assembly as claimed in claim 4, said piston having a head, said cam having an elongated rib for abutting and engaging said cylinder head.

6. A piston position sensing apparatus for sensing the position of a first piston and a second opposed piston within a cylinder, said cylinder having an inner cylinder wall and an outer surface, comprising:

a first signalling device;

a second signalling device; and a cam operably coupled to said first signalling device and received through said outer surface and said inner wall for movement from a null position to a first position when said first piston operably engages said cam and for movement from said first position to said null position when said first piston operably disengages said cam, said cam being further operably coupled to said second signalling device for movement from said null position to a second position as said second piston operably engages said cam and movement from said second position to said null position as said second piston operably disengages said cam, said cam further including means for forming a fluid tight seal along said cam between said inner cylinder wall and said outer surface.

7. An assembly as claimed in claim 6, said cam at least partially received within said inner wall for operable abutting contact of said cam with said first and second pistons, said cam including a lever arm shiftably received through said cylinder wall and operably coupled to said cam for extending and amplifying said movement of said cam.

8. An assembly as claimed in claim 7, including biasing means for urging said cam towards said null position.

* * * * *